United States Patent
Tsuda et al.

[11] Patent Number: 5,923,468
[45] Date of Patent: Jul. 13, 1999

[54] SURVEYING INSTRUMENT HAVING AN AUTOMATIC FOCUSING DEVICE

[75] Inventors: Koji Tsuda; Shinichi Suzuki; Ryota Ogawa, all of Tokyo, Japan

[73] Assignee: Asahi Kogaku Kogyo Kabushiki Kaisha, Tokyo, Japan

[21] Appl. No.: 08/885,858

[22] Filed: Jun. 30, 1997

Related U.S. Application Data

[30] Foreign Application Priority Data

Jul. 1, 1996 [JP] Japan ................................ 8-171121
Jul. 1, 1996 [JP] Japan ................................ 8-171122

[51] Int. Cl.$^6$ .......................... G02B 23/04; G02B 7/09; G01C 3/08
[52] U.S. Cl. ................... 359/426; 359/400; 250/201.2; 356/5.01
[58] Field of Search .................... 359/426, 429, 359/399, 427, 400; 250/201.2, 201.4; 356/5.01

[56] References Cited

U.S. PATENT DOCUMENTS

| | | | |
|---|---|---|---|
| 3,634,011 | 1/1972 | Scholdstrom | 356/5.01 |
| 4,041,505 | 8/1977 | Hartmann | 250/201.2 |
| 4,542,986 | 9/1985 | Berdanier | 356/5.04 |
| 4,711,999 | 12/1987 | Shishido et al. | 250/201.2 |
| 5,283,622 | 2/1994 | Ueno et al. | 356/5.01 |
| 5,796,517 | 8/1998 | Sensui et al. | 359/426 |

*Primary Examiner*—Jon Henry
*Attorney, Agent, or Firm*—Greenblum & Bernstein P.L.C.

[57] ABSTRACT

A surveying instrument is provided having a sighting telescope and a distance measuring device. The sighting telescope has a focusing lens group which is moveable to focus an object to be measured. The distance measuring device measures a distance between the object and the surveying instrument. A focusing operation of the sighting telescope is carried out to move the focusing lens group to a focal position of the object in accordance with the distance between the object and the surveying instrument measured by the distance measuring device.

10 Claims, 3 Drawing Sheets

SURVEYING INSTRUMENT HAVING AN AUTOMATIC FOCUSING DEVICE

BACKGROUND OF THE INVENTION

1. Field of the Invention

The present invention relates to an apparatus for measuring a distance using light radiation and a surveying instrument having an automatic focusing device.

2. Description of the Related Art

In a surveying instrument having a distance measuring function, such as an optical distance meter or a total station, etc., a sighting telescope is oriented toward a target point and a focusing knob is manually rotated to focus the telescope on the target point.

However, the manual focus adjustment prevents an operator from concentrating on the sighting operation, thus increasing the length of time necessary to complete the focusing operation.

In a surveying instrument having a distance measuring function, such as an optical distance meter or total station, etc., object measuring light emitted from a light source, such as a light emitting diode (LED) or laser diode, toward an object (aiming object) to be measured is reflected from the object before being received, to detect the distance between the surveying instrument and the object. The distance is detected using a phase difference detection method in which a phase difference or time difference between the emitted light and the received light is detected. A known optical distance meter is provided with a sighting telescope which makes the measuring light incident upon the object to be measured.

However, in conventional optical distance meters (an optical range finder or an electronic distance meter), the emission angle of the measuring light (detection beam) is restricted when detecting the distance of an object located from a close distance to a long distance, for example, 1 KM or more. To this end, if the object deviates from the center of the field of view of the sighting telescope when the object is viewed through the sighting telescope, there is a possibility that little or no measuring light reaches the object to be measured, resulting in non-measurement or an incorrect measurement.

SUMMARY OF THE INVENTION

It is an object of the present invention to provide a surveying instrument having an automatic focusing device.

Another object of the present invention is to provide a surveying instrument having an optical macrometer (distance meter) and a sighting telescope in which measuring light can be easily and correctly made incident upon an aiming point.

To achieve the above objects, according to one of the most significant features of the present invention, a focusing lens group of a sighting telescope is moved to a focal position at which the telescope is focused on the measuring point measured by a distance measuring function (macrometer function) in a surveying apparatus. Namely, according to the present invention, there is provided a surveying instrument having a sighting telescope having a focusing lens group which is movable to focus an object to be measured, and a distance measuring device for measuring the distance between the object and the surveying instrument. The focusing operation of the sighting telescope is carried out to move the focusing lens group to a focal position of the object in accordance with the distance between the object and the surveying instrument measured by the distance measuring device.

In an embodiment of the present invention, a surveying instrument includes an optical distance measuring portion which emits measuring light and receives the measuring light reflected by the object to measure the distance of the object. A focusing device is provided which includes an automatic focusing device which controls the focus of the sighting telescope so that the latter is focused on the object located at the object distance measured by the distance measuring device.

According to another embodiment of the present invention, the sighting telescope includes an objective lens, a dichroic prism which permits visible light to pass therethrough, a focusing lens system, an image erecting system, a focusing plate, and an eyepiece system, in this order from an object side. The optical distance measuring portion can be provided with a light emitter which emits the measuring light and a light receiver which receives the measuring light reflected by the object to be measured, so that the measuring light emitted from the light emitter is reflected by the dichroic prism, transmitted through the objective lens and reflected by the object, transmitted through the objective lens, reflected by the dichroic prism, and reflected by the mirror and received by the light receiver.

According to another aspect of the present invention, a distance measuring apparatus having an optical sighting system is provided. The measuring light is collimated by the sighting system and is emitted toward an object to be measured, and the measuring light reflected by the object to be measured is received to determine the distance of the object. A divergence angle adjusting device is provided for adjusting the divergence angle of the measuring light emitted from the light emitting device.

The divergence angle adjusting device can be replaced by a beam diameter varying device for varying the beam diameter of the measuring light emitted therefrom. In short, the present invention is characterized in that the illumination area of the object which is to be illuminated with the measuring light is adjustable or variable.

The present disclosure relates to subject matter contained in Japanese Patent Application Nos. 08-171121 and 08-171122 (both filed on Jul. 1, 1996) which are expressly incorporated herein by reference in their entireties.

BRIEF DESCRIPTION OF THE DRAWINGS

The invention will be discussed below in detail with reference to the accompanying drawings: in which.

DESCRIPTION OF THE PREFERRED EMBODIMENTS

Figure 1:
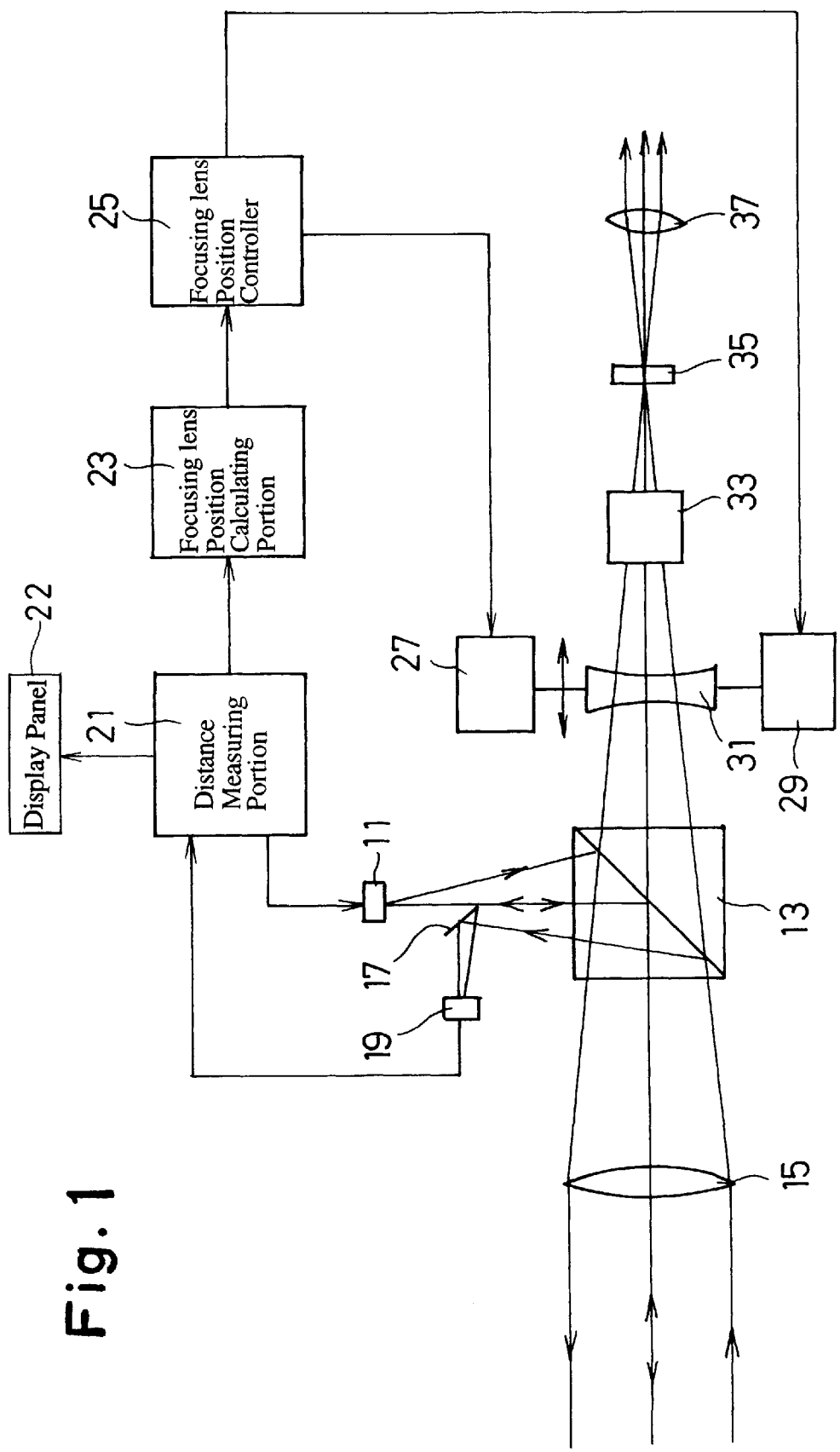
FIG. 1 is a block diagram of an embodiment of an optical macrometer to which the present invention is applied.

An optical macrometer using light radiation consists of a light emitter 11 which emits measuring light, a dichroic prism 13 which reflects the measuring light, an objective lens 15 which functions not only as a light emitting lens to emit the measuring light toward a target (object to be measured) but also as a light receiving lens to receive the measuring light reflected by the object, a reflection mirror 17 which reflects the measuring light incident upon the objective lens 15 and reflected by the dichroic prism 13, a light receiver 19 which receives the measuring light reflected by the reflection mirror 17, and a distance measuring portion 21 which controls the light emitter 11 and the light receiver 19 and detects the object distance. The light emitter 11 includes a measuring light emitting device which can be provided with a light emitting diode (LED) or laser diode (LD), etc., or a light emitting unit including an optical system having an LED or LD incorporated therein.

The dichroic prism 13 reflects the measuring light and permits natural light (visible light) to pass therethrough. To this end, light having a wavelength outside of the range of the wavelength of the visible light, such as infrared rays, is used as the measuring light. Note that a corner cube or a mirror, etc., can be used as the aiming object (target), the surface of the object to be measured by which the measuring light is reflected is used as the target in case of a non-prism type optical macrometer.

The distance measuring portion 21 calculates the distance of the target therefrom in accordance with the measuring light emitted from the light emitter 11 and received by the light receiver 19, using a known algorithm in a phase difference measuring system or an optical radar system, etc. The distance determined is indicated in a display panel 22.

The optical macrometer is provided with a sighting telescope which includes the objective lens 15, the dichroic prism 13, a focusing lens 31, an image erecting prism 33, a focusing plate 35, and an ocular lens (eyepiece) 37, in this order from the object side. The sighting telescope system collimates the macrometer with respect to the aiming object to be measured. The sighting telescope and the distance measuring portion are integrally formed within a body (not shown) which is mounted to a base plate so as to adjust the azimuth and the depression/elevation angles with respect to the vertical axis and the horizontal axis.

The light (visible light) incident upon the objective lens 15 is transmitted through the dichroic prism 13 and is converged onto the focusing plate 35 or in the vicinity thereof to form a real erect image through the focusing lens 31 and the image erecting prism 33. The operator can view the enlarged image through the eyepiece 37. The focusing plate 35 is provided with a measurement mark which serves as a reference for the emission of the measuring light and a cross necessary for the measurement. The operator controls the azimuth and the depression/elevation angles of the sighting telescope while viewing the image of the target and the measurement mark overlapped thereon, so that the target is located on the measurement mark, that is, the measuring light reaches the target.

The constituent feature of the present invention will be discussed below. According to the main feature of the present invention, the distance measuring portion 21 moves the focusing lens 31 in accordance with the object distance obtained by the calculation, so that the sighting telescope is focused on the object to be measured (target) located at the object distance.

In the illustrated embodiment, in accordance with the object distance determined by the distance measuring portion 21, the position of the focusing lens 31 in which the image of the object (target) located at the object distance is formed on the focusing plate 35 is calculated by the focusing lens position calculating portion (focusing lens position calculating means) 23. A focusing lens driver (focusing lens driving means) 27 having a motor or the like is actuated by a focusing lens position controller (focusing lens position control means) 25 in accordance with the lens position data obtained by the focusing lens position calculating portion 23 and the lens position data of the focusing lens 31 detected by a focusing lens position detecting device (focusing lens position detecting means) 29 to move the focusing lens to the focal position.

The above-mentioned measurement of the object distance and the focusing operation are repeated to correctly focus the sighting telescope on the target. Consequently, the operator can carry out the collimation using the sighting telescope which is correctly focused on the target, and hence the optical macrometer can be exactly oriented toward the target. Thus, the measuring light can be correctly impinged upon the target, and the degree of precision of the measurement can be enhanced.

The relationship between the calculated object distance and the position of the focusing lens 31 which is focused on the target (i.e., the position in which an image of the object at the object distance is formed on the focusing plate 35) is set as follows by way of example.

The relationship therebetween is obtained in advance by a calculation in accordance with the design value of the optical system or the actual measurement of the object distance of the target and is shown in a number of divided zones in a table which is stored in a memory, such as a ROM. The lens position corresponding to the object distance calculated by the distance measuring portion 21 can be obtained with reference to the table stored in the memory. Alternatively, it is also possible to store a formula which represents the relationship between the object distance and the position of the focusing lens 31 which is focused on the object at each object distance in a memory (ROM, etc.). In this alternative, the lens position can be determined based on the formula, upon measurement of the object distance.

The focusing lens position detecting device 29 which detects the position of the focusing lens 31 can be made up of a code plate which extends in the direction of the movement of the focusing lens 31 and an absolute position detecting device which reads position codes formed on the code plate using a code reader, or a relative position detecting device which counts the number of revolutions of the motor of the focusing lens driver 27 to detect the displacement of the focusing lens 31 with respect to a reference position. It is also possible to detect the approximate position of the focusing lens 31 by the absolute position detecting device and thereafter to precisely detect the position thereof by the relative position detecting device.

Although the objective lens of the sighting telescope is used as the light emitting and receiving lens of the measuring light emitted from the light emitting unit in the embodiment mentioned above, it is possible to provide the light emitting and receiving lens separate from the objective lens.

Figure 2:
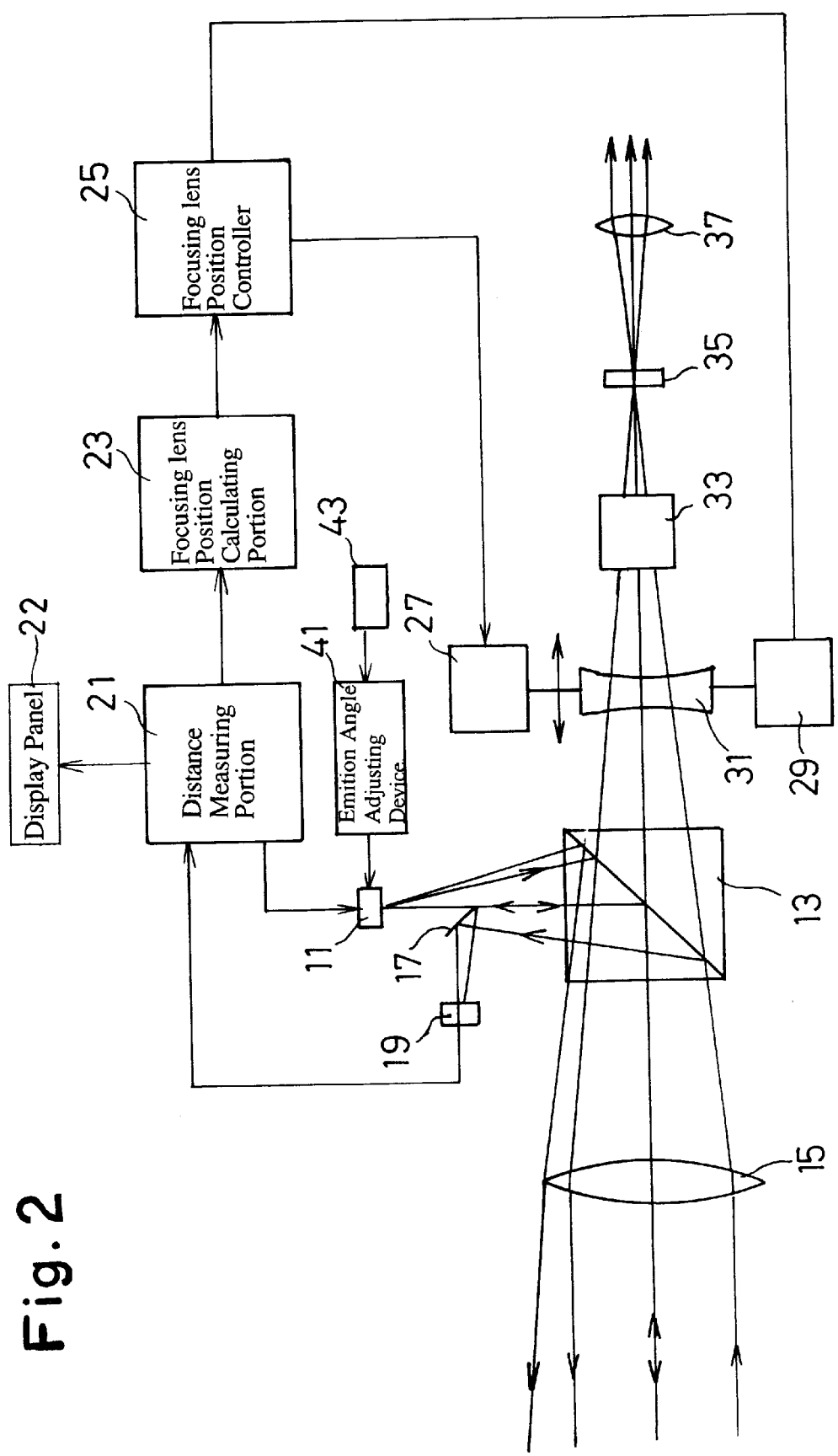
FIG. 2 is a block diagram of another embodiment of an optical macrometer to which the present invention is applied.

The following discussion will be addressed to the adjustment of the beam diameter with reference to FIG. 2. In FIG. 2, the elements corresponding to those in FIG. 1 are designated with like reference numerals, and no duplicate explanation therefor will be given. In the arrangement shown in FIG. 2, an emission angle adjusting device 41 is provided which adjusts the emission angle (divergence angle) of the measuring light emitted from the objective lens 15. The emission angle adjusting device 41 is provided with a manual operation device 43 which is manually actuated by an operator, so that when the operation device 43 is actuated, the divergence angle of the measuring light emitted from the light emitter 11 is varied. The convergence angle of the measuring light emitted from the objective lens 15 increases as the emission angle of the measuring light emitted from the light emitter 11 increases. The adjustment of the divergence of the measuring light makes it possible to easily impinge the measuring light upon the target.

Figure 3:
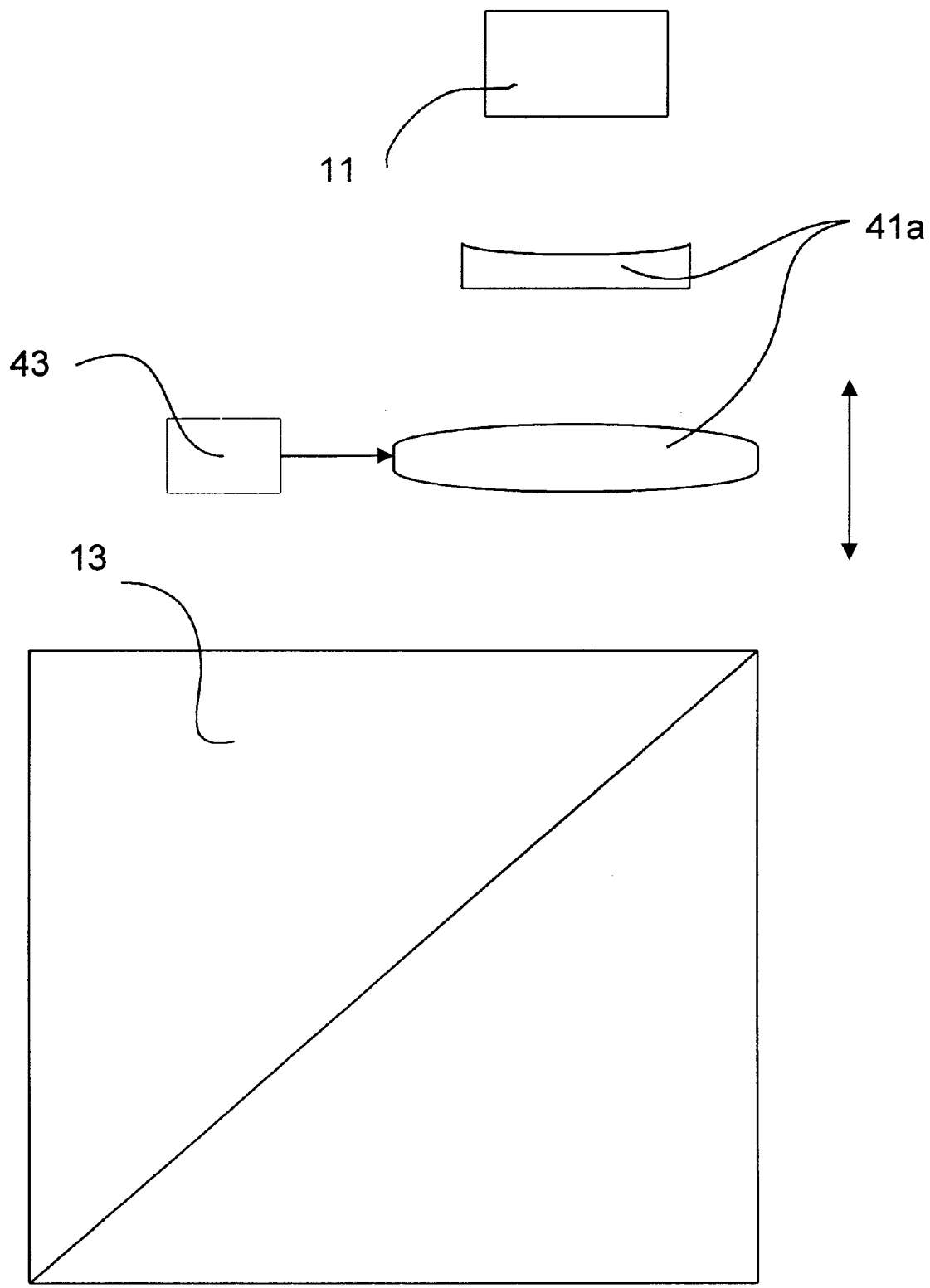
FIG. 3 is a schematic diagram of an example of the emission angle adjusting device shown in FIG. 2.

An example of one possible variety of emission angle adjusting device 41a is shown in FIG. 3. In FIG. 3, a front lens group (on the side toward the dichroic prism 13) and a rear lens group (on the side toward the light emitter 11) constitute a Galilean beam expander. The beam expander, as the emission angle adjusting device 41a, is used for adjusting the beam diameter or light emission angle. It should be noted that the constitution of the emission angle adjusting device 41a shown in FIG. 3 is not to scale, and that the lens parameters and appropriate distances of a functioning conventional Galilean beam expander may be readily selected by one skilled in the art.

In order to actuate the emission angle adjusting device 41a, the manual operation device 43 is connected to the front lens group of the emission angle adjusting device 41a, via a conventional driving mechanism such as a rack and pinion, or screw drive. When the manual operation device 43 is actuated, the front lens group of the emission angle adjusting device 41a is moved relative to the rear lens group of the emission angle adjusting device 41a, thereby changing the emission angle or beam diameter of the light reaching the dichroic prism 13. The Galilean beam expander is used in the embodiment illustrated in FIG. 2.

In the embodiment illustrated in FIG. 2, in accordance with the object distance calculated by the distance measuring portion 21, the position of the focusing lens 31 in which the image of the object (target) located at the object distance is formed on the focusing plate 35, is determined by the focusing lens position calculating portion 23. The focusing lens position controller 25 actuates the focusing lens drive device 27 having a motor or the like, in accordance with the position data calculated by the focusing lens position detecting device 25 to thereby move the focusing lens 31 to a focal position.

If the sighting telescope is not correctly focused on the target, the possibility exists that no measuring light may reach the target. If this occurs, the operator actuates the manual operation device 43 and adjusts the emission angle of the measuring light by the emission angle adjusting device 41 to increase the emission angle. Consequently, the measuring light is impinged upon the target, so that the sighting telescope can be correctly focused on the target in accordance with the distance measurement and the automatic focusing operation. If the image of the target becomes clear, the direction of the sighting telescope can be precisely adjusted, and hence the operation device 43 is actuated to reduce the emission angle of the measuring light. If the emission angle of the measuring light is reduced, the density and intensity of the measuring beam are increased, thus resulting in a more precise measurement of the object distance. It is possible to construct the emission angle adjusting device 41 such that the emission angle is at a minimum at the initial position and that the emission angle is automatically increased from the minimum angle when no appropriate object distance can be obtained.

The emission angle of the measuring light is such that it covers the entire field of view of the sighting telescope. In general, since the focal point of the sighting telescope does not substantially vary when the object distance is above 100 m, automatic focusing is not needed for an object distance of more than 100 m. For an object distance of more than 100 m, the focus can be controlled at a specific object distance between 100 m and infinity. Thus, the sighting telescope can be substantially focused on an object located between the closest distance and infinity.

The relationship between the measured object distance and the position of the focusing lens 31 in which the latter is focused on the object at the measured object distance (i.e., the position in which the image of the object located at the object distance is formed on the focusing plate 35) is obtained in advance by a calculation in accordance with the design value of the optical system or the actual measurement of the object distance of the target, and is shown in a number of divided zones in a table which is stored in a memory such as a ROM. The lens position corresponding to the object distance calculated by the distance measuring portion 21 can be obtained with reference to the table stored in the memory. Alternatively, it is also possible to store a formula which represents the relationship between the object distance and the position of the focusing lens 31 which is focused on the object at each object distance in a memory (ROM, etc.). In this alternative, the lens position can be determined based on the formula, and upon measurement of the object distance.

It goes without saying that the illustrated embodiment is a non-limiting example and the structure of the optical system or the control system, etc., in the optical macrometer is not limited to the illustrated embodiment. Moreover, although the present invention is applied to an optical macrometer in the illustrated embodiment, the present invention is not limited thereto and can be generally applied to a surveying instrument having a distance measuring apparatus and an optical sighting system, such as a total station.

Although the divergence angle of the measuring light is adjusted by the emission angle adjusting apparatus 41 in the illustrated embodiment, it is possible to adjust the divergence angle by varying the optical length between the light emitting element (not shown) of the light emitter 11 and the objective lens 15, or by retractably inserting a lens in front of the light emitting member, or by moving a lens provided in front of the light emitting member close to or away from the light emitting member. If the laser beam is used as the measuring light, it is possible to control the divergence angle of the laser beam, using an optical system to adjust the beam waist.

As can be understood from the above discussion, according to the present invention, since the focus of the sighting telescope is controlled in accordance with the distance data obtained by the optical macrometer, it is not necessary for the operator to effect a manual focus control, and hence the operator can concentrate on the surveying operation, thus resulting in increased efficiency of the surveying operation. Moreover, according to the present invention, since the distance measuring function of the surveying instrument is utilized, not only can the number of components be reduced, but also the surveying instrument can be made small and light.

What is claimed is:

1. A surveying instrument, comprising:

a sighting telescope having a focusing lens group which is movable to focus on an object to be measured;

a distance measuring meter which is adapted to measure a distance between said object and said surveying instrument;

a focusing device which drives said focusing lens group of said sighting telescope in accordance with said distance between said object and said surveying instrument measured by said distance measuring meter; and an optical distance measuring portion which emits measuring light and receives said measuring light reflected by said object to measure said distance between said object and said surveying instrument, wherein said focusing device comprises an automatic focusing device which controls a focusing operation of said sighting telescope so that said sighting telescope is focused on said object:

wherein said sighting telescope comprises an objective lens, a dichroic prism which permits visible light to pass therethrough, said focusing lens system, an image erecting system, a focusing plate, and an eyepiece system, in this order from an object side, and further wherein said optical distance measuring portion comprises a mirror which reflects said measuring light emitted by a light emitter toward said dichroic prism and said object to be measured, transmitted through said objective lens and reflected by said dichroic prism toward said light emitter, and a light receiver which receives said measuring light reflected by said mirror.

2. The surveying instrument according to claim 1, wherein said focusing device comprises drive means for driving said focusing lens group of said sighting telescope, focusing lens position detecting means for detecting a position of said focusing lens group, focusing lens position calculating means for determining a focal position of said focusing lens group at which said sighting telescope is focused on said object, and focusing lens position control means for moving said focusing lens group to said focal position determined by said focusing lens position calculating means.

3. The surveying instrument according to claim 1, wherein said optical distance measuring portion comprises an optical range finder.

4. A surveying instrument, comprising:

light emitting means which emits measuring light toward an object to be measured;

light receiving means for receiving said measuring light reflected by said object to be measured;

distance measuring means for measuring a distance of said object in accordance with said measuring light received by said light receiving means;

divergence angle adjusting means for adjusting a divergence angle of said measuring light emitted from said light emitting means; and a sighting telescope having a focusing lens system which is movable to focus on the object to be measured;

wherein said sighting telescope comprises an objective lens, a dichroic prism which permits visible light to pass therethrough, said focusing lens system, an image erecting system, a focusing plate, and an eyepiece system, in this order from an object side, and further wherein said optical distance measuring portion comprises a mirror which reflects said measuring light emitted by a light emitter toward said dichroic prism and said object to be measured, transmitted through said objective lens and reflected by said dichroic prism toward said light emitter, and a light receiver which receives said measuring light reflected by said mirror.

5. The surveying instrument according to claim 4, wherein said divergence angle adjusting means comprises manual operation means which is manually actuated by an operator so that when said manual operation means is actuated said divergence angle of said measuring light is varied.

6. A surveying instrument according to claim 4, wherein said divergence angle adjusting means is capable of reducing a divergence angle of said measuring light from a divergence angle substantially corresponding to an angle of view of said sighting telescope.

7. A surveying instrument according to claim 4, wherein said divergence angle adjusting means varies a beam diameter of said measuring light emitted therefrom.

8. A surveying instrument according to claim 7, wherein said measuring light is a laser beam.

9. A surveying instrument according to claim 8, wherein said divergence angle adjusting means comprises a beam waist position adjusting device for adjusting a beam waist of said laser beam.

10. A surveying instrument according to claim 4, wherein said divergence angle adjusting means comprises a sighting system which collimates said measuring light emitted from said light emitting means.

* * * * *